3,518,112
PROCESS FOR THE PREVENTION OF AGGLOMERATION OF POLYESTER PARTICLES
Joachim Hecht, Hans Luckert, and Hans-Ruedi Rufer, Domat - Ems Grisons, Switzerland, assignors to Inventa A.G. für Forschung und Patentverwertung, Zurich, Switzerland
No Drawing. Filed June 29, 1967, Ser. No. 698,991
Claims priority, application Switzerland, July 1, 1966, 9,821/66
(Filed under Rule 47(a) and 35 U.S.C. 116)
Int. Cl. B44d 5/08; C08g 17/14
U.S. Cl. 117—100       1 Claim

ABSTRACT OF THE DISCLOSURE

A process for the prevention of agglomeration of polyester resin particles by adding to the particles a given amount of a lubricant in very small quantities when the polyester is in amorphous state. The mixture then is heated slowly up to 150° C. whereby the resin converts from the amorphous to the crystalline state. The particles then are free-flowing. The process is applicable to all polyester resins which convert from the amorphous to the crystalline state.

---

It is known that granulated polyamides, similar to polyesters, have a pronounced tendency toward agglomeration when they are converted from the amorphous to the crystalline state. This agglomeration renders fabrication of the resin very difficult. The conversion from one phase to the other occurs relatively rapidly with polyamides. In order to ameliorate this tendency toward agglomeration and sticking of the particles to each other, lubricants are added thereto. These must be specifically adapted to the characteristics of the polyamides, especially since they usually are organic substances, and their effect regarding adhesion and tack had been limited to polyamides.

It now has surprisingly been found that granulated polyester resins can be prevented from agglomeration and exhibition of surface tack by the use of lubricants. This is the more unexpected as polyester granules differ from polyamide granules insofar as the heating time required for conversion from the amorphous to the crystalline state is much longer for polyesters.

It therefore is the object of the invention to prevent the agglomeration and surface tack of polyester resin particles by adding to the granules a very small quantity of magnesium stearate, i.e., 0.01 to 0.1 weight percent, and carrying out the conversion from amorphous to crystalline state at slowly rising temperatures. Thereby the melting stearate is finely distributed over the surfaces of the granules as a thin coherent layer. That the temperature increase must be very slow becomes evident from the fact that the polyester granules still are tacky at 80° C. even in the presence of magnesium stearate. When the phase conversion has proceeded far enough between 80 and 95° C., the temperature slowly is raised to 120° C. and finally to 150° C. without agglomeration of the particles.

Any polyester resin which converts from the amorphous to the crystalline state can be treated in this manner and thereby gains the advantage over untreated resins that fabrication in such devices as extruders is facilitated and surface tack and agglomeration of the individual particles is precluded.

The invention now will be more fully explained by the following example. However, it should be understood that the same is given merely by way of illustration, and not of limitation, and that it is intended to cover all modifications and variations which do not depart from the spirit and the scope of the invention as hereinafter claimed.

EXAMPLE 1.5 kg. polyester shavings were mixed with 0.3 g. magnesium stearate in an externally heated paddle drier at 80° C. The temperature was raised gradually to 95°, 120° and finally to 150° C., and this temperature maintained until crystal formation had been completed. At that time no more tack was present on the polyester surfaces, and the polyester resin was ready for further fabrication heating from 80 to 95°, from 95 to 120° and from 120 to 150°, was carried out in time intervals of 5 to 30 minutes.

We claim as our invention:
1. A process for the suppression of agglomeration and surface tack of polyester resin particles which resin is converticle from an amorphous to a crystalline state, which process comprises adding to said particles 0.01 to 0.1 weight percent magnesium stearate at an incipient temperature of substantially 80° C., thereby starting conversion of said particles from the amorphous to the crystalline state; raising the temperature gradually to 95° C., then to 120 and finally to 150° C., thereby completing said conversion and eliminating agglomeration and surface tack.

References Cited

UNITED STATES PATENTS

| | | | |
|---|---|---|---|
| 2,539,012 | 1/1951 | Diamond et al. | 252—383 X |
| 2,589,330 | 3/1952 | Bradford et al. | 252—385 X |
| 2,678,285 | 5/1954 | Browning | 117—138.8 X |
| 3,017,714 | 1/1962 | Slosberg et al. | 117—100 X |
| 3,110,617 | 11/1963 | Scott | 117—138.8 |

WILLIAM D. MARTIN, Primary Examiner

M. R. P. PERRONE, Jr., Assistant Examiner

U.S. Cl. X.R.

117—138.8; 252—384